United States Patent [19]

Erlandson et al.

[11] 4,009,234
[45] Feb. 22, 1977

[54] METHOD FOR HIGH SPEED SINTER MOLDING

[75] Inventors: Paul M. Erlandson, Palos Park; Richard R. Szatkowski, Western Springs, both of Ill.

[73] Assignee: Continental Can Company, Inc., New York, N.Y.

[22] Filed: Sept. 15, 1975

[21] Appl. No.: 613,377

Related U.S. Application Data

[60] Continuation of Ser. No. 335,274, Feb. 23, 1973, abandoned, which is a continuation-in-part of Ser. No. 73,936, Sept. 21, 1970, abandoned, which is a division of Ser. No. 790,283, Jan. 10, 1969, Pat. No. 3,570,055.

[52] U.S. Cl. .................................. 264/24; 264/121; 264/126; 264/297; 264/331
[51] Int. Cl.² .................... B29D 23/03; B29F 5/02
[58] Field of Search .............. 264/22, 24, 121, 126, 264/297, 331; 425/174.8 R, 359, 360, 361, 357, 233, 114, 407

[56] References Cited

UNITED STATES PATENTS

| 3,187,381 | 6/1965 | Britten | 264/24 |
|---|---|---|---|
| 3,278,656 | 10/1966 | Dicks et al. | 264/24 |
| 3,298,064 | 1/1967 | Taga | 425/371 |

*Primary Examiner*—Willard E. Hoag
*Attorney, Agent, or Firm*—H. Lawrence Smith; Joseph E. Kerwin; William A. Dittmann

[57] ABSTRACT

A method for high speed sinter molding having endless chains mounted side by side. Mold halves are attached at spaced intervals down the chains. The paired mold halves come next to each other to form a female mold into which is deposited a polymeric material. A treating core extends inside the mold and as the mold traverses its path, it surrounds the core and the core deposits polymeric powder, heats the polymeric powder, and then cools it. At the end of the mold path, the finished article is ejected and is ready for the next operation.

Another embodiment of the same essential process is to place the paired mold halves in juxtaposition as they moved down over the core. This will result in the fabrication of a continuous conduit. A container may be fabricated by using hollow mold halves with heating and deposition accomplished before the hollow mold halves are pressed together to form a hollow container.

1 Claim, 17 Drawing Figures

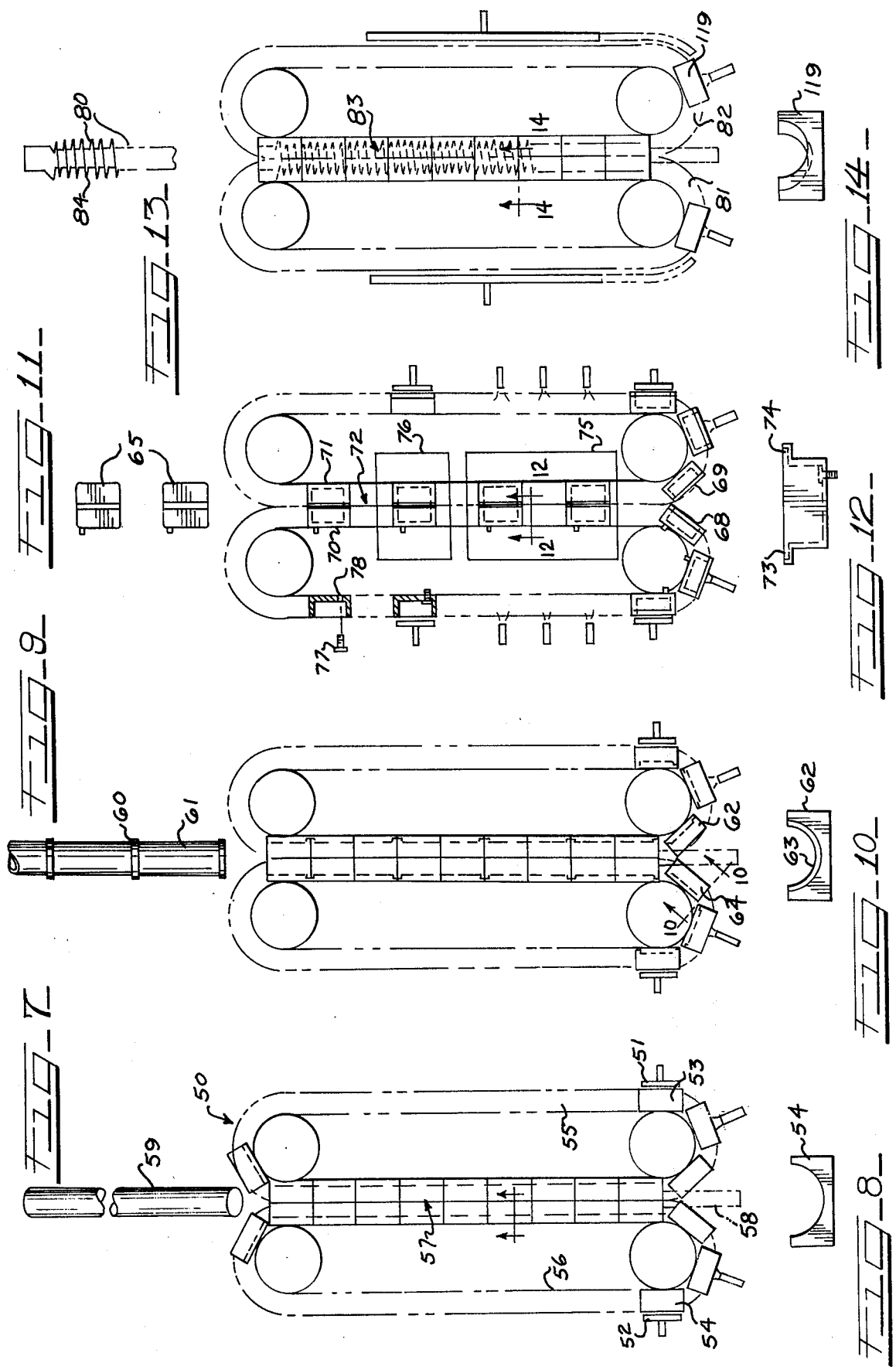

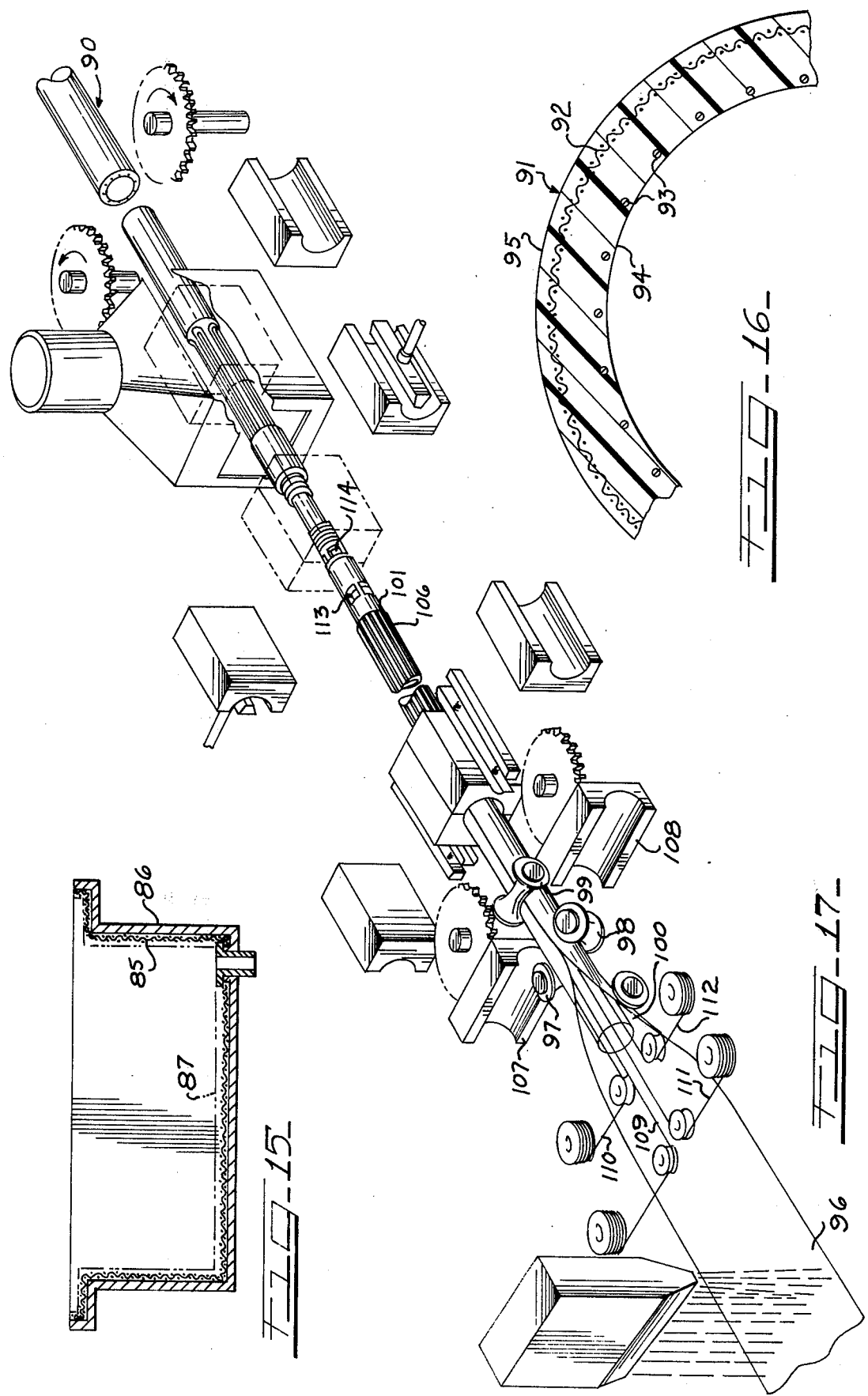

METHOD FOR HIGH SPEED SINTER MOLDING

This is a continuation of Ser. No. 335,274, filed Feb. 23, 1973 which is a continuation-in-part of Ser. No. 73,936, filed Sept. 21, 1970, now abandoned, which is in turn a division of Ser. No. 790,283, filed Jan. 10, 1969, now U.S. Pat. No. 3,570,055, issued Mar. 16, 1971.

Our invention relates to a sinter molding apparatus, and particularly to an apparatus for the very high speed manufacture of polymeric articles from polymeric powders using sintering techniques.

Various equipment has been developed using sintering techniques wherein a polymeric powder is sprayed or dusted onto a heated treating core and fused into a homogenous surface.

It is an object of our invention to provide a method for the high speed manufacture of sintered articles.

It is another object of our invention to provide a method for sintering thermoplastic resins and having flexible usage in the manufacture of container elements.

It is another object of our invention to provide a method for the manufacture of containers with unusual molded shapes.

It is a final object of our invention to provide for the manufacture of composite structures of thermoplastic resin.

In brief, our invention relates to a high speed means for making sintered hollow articles. Two endless belts are mounted side by side and have paired mold halves located at spaced intervals along the belts. As the belts traverse their path, one mold half from each belt contacts an opposed mold half to form a complete female mold for about half of the cycle time. A treating core is located longitudinally inside the female mold and deposit nozzles, heaters, and coolers are located at spaced positions down the core to accomplish the ultimate purpose of depositing a thermoplastic resin container element in the female mold. The finished article is ejected from the end of the system and may be further cooled as part of the next operation.

With the above and other objects in view that will hereinafter appear, the nature of the invention is more clearly understood by reference to the following detailed description, the appended claims, and the several views illustrated in the accompanying drawings in which:

FIG. 7 shows a schematic view of an apparatus for fabricating continuous pipe;

FIG. 8 shows a cross section view of a mold half taken along the line 7—7;

FIG. 9 shows a schematic view of an apparatus for fabricating flanged pipe;

FIG. 10 shows an end view of a mold half used for fabricating flanged pipe;

FIG. 11 shows a schematic view of an apparatus for fabricating a series of closed containers;

FIG. 12 shows a mold half taken along the line 11—11 of FIG. 11;

FIG. 13 shows a schematic view of an apparatus for fabricating a flexible conduit;

FIG. 14 shows an end view of a mold half used in one embodiment of the apparatus of FIG. 13 and taken along line 14—14;

FIG. 15 shows a cross-sectional view of a mold half used in the embodiment of FIG. 11;

FIG. 16 shows a partial cross-sectional view of a conduit made by the apparatus of FIG. 17;

FIG. 17 shows a schematic view of an apparatus for fabricating plastic conduit of the type shown in FIG. 16.

Figure 1:
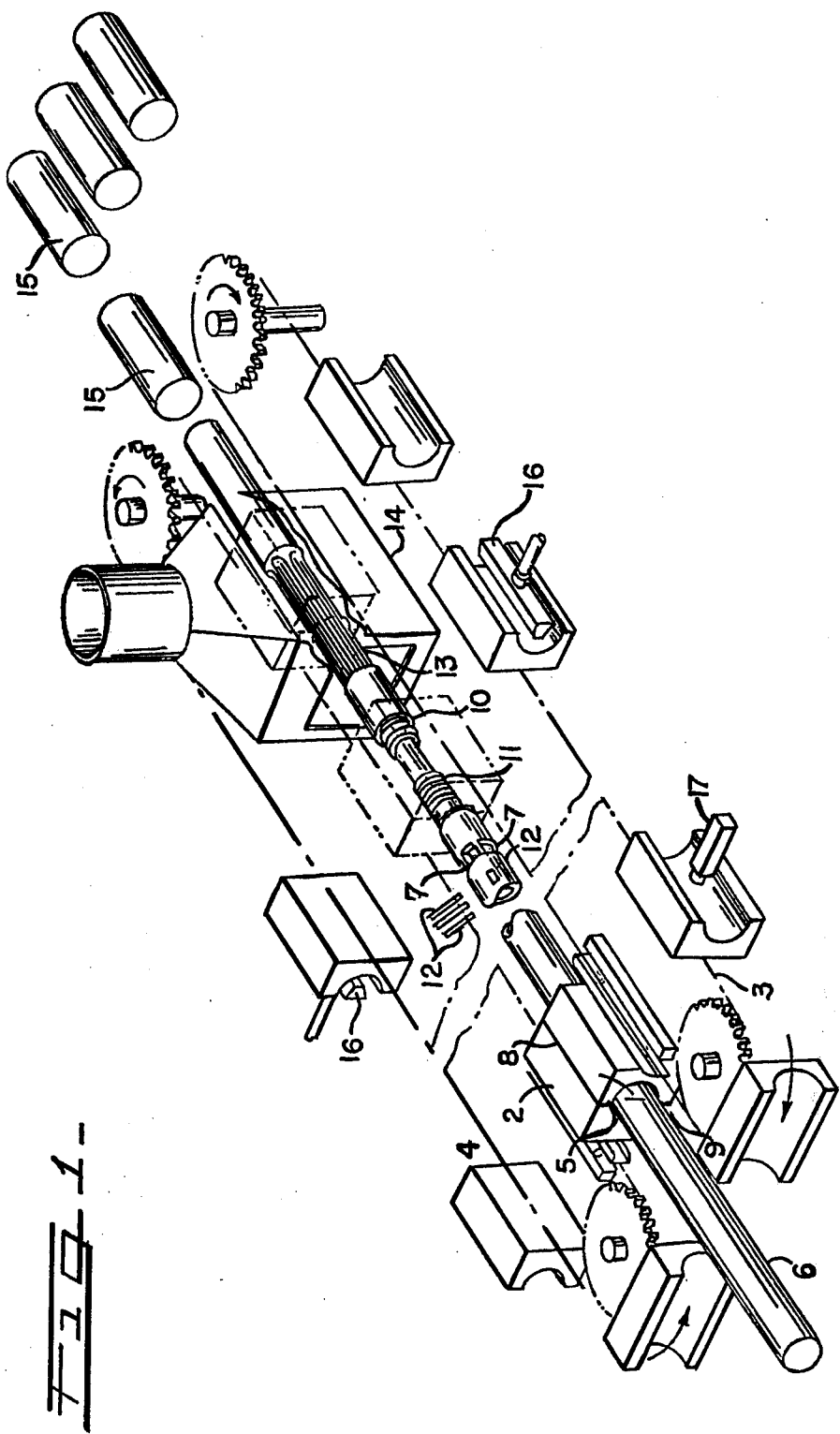
FIG. 1 shows a schematic view of the apparatus.

The organization and structure of the endless belt or chain device is essentially the same as that shown in the patent entitled "Tube Pulling Mechanism for a continuous Welding Machine", by Edwin D. Baugh et al., U.S. Pat. No. 3,056,535, issued Oct. 2, 1962, and assigned to the assignee of this invention. In our device, the jaw assemblies of the above apparatus are replaced by mold halves.

The mold halves 1, 2 are attached to the endless belts or chains 3, 4 (FIG. 1) and as the halves pass down the center of the machine, they are pressed together to form a single mold surface 5. The mold surfaces or parts are not necessarily matched as to shape or size and irregular, composite, decorated, hollow or printed containers or articles may be manufactured by our device.

A treating core 6 is mounted with its long axis parallel to the direction of travel of the mold and located so that the mold passes over the core. The embodiment shown in FIG. 1 has polymeric powder deposit nozzles 7 lined around the exterior periphery of the mandrel 6. A finely divided polymeric powder which is suspended in air is forced out of the nozzle. As the mold form 5 passes over the nozzle, powder is sprayed out against the sides of the mold and adheres to the sides of the mold.

The polymeric powder deposit nozzles may be lined around the periphery of the core surface to coat the entire inner surface of the female mold or the nozzles may be directed to coat any desired areas, such as the seams 8, 9 shown as above and below. Deposition is accomplished by charging the particles electrostatically and having the mold at a different potential so that the charged particles are attracted to the mold.

The powder deposited on the inner wall 5 may be fused by a core heating device 10 located next down the line. Core heating may be accomplished by an electro-induction heating coil 11, for example, for putting a well-controlled finishing heat to the thermoplastic resin. Alternatively, heat may be applied inside the mold halves by heating coils, for example. The heat applied at this point is sufficient to cause the thermoplastic material to fuse and may be controlled by a thermal sensing device 12, such as one or more small infra-red sensitive photo conductors, located on the core to sense the temperature of the powder on the form. Alternatively, the mold temperature may be picked up by the same kind of sensor 12 located exteriorly of the mold. Depending on the powder temperature, additional heat may be applied to the powder by a fine heat control system, such as induction heater 11.

A fine heating at coils 10, 11 could be accomplished by inductive heating controlled by an automatic temperature sensing device such as an optical pyrometer 12. In practice, a series of optical pyrometers are located down the length of the core and may be located just up-stream of the core heating device. These pyrometers control the degree of heat used so that the polymeric powder deposited inside of the mold is heated only to the temperature necessary for fusion in order to avoid detrimental effects which might take place at very high temperatures.

Heaters 10, 11 raise the temperature of the polymeric powder just sufficiently to cause fusion. Thus, the amount of cooling necessary in the next step is reduced. In any case, after the fused thermoplastic article has passed the core inductive heating device 11, it is at such temperature that a given amount of cooling reduces it through the number of degrees necessary to give it the properties desired.

After the powder has fused to form, the fused material is exposed to a cooling element 13 so that the hot fused resin becomes solid. A water or air cooling chamber 14 may be located along the path and cool the mold as the mold moves through the chamber.

The cylindrical container element 15 is now ejected from the machine and is ready for the next operation. The next operation may be further cooling or possibly the application of an end to the hollow article.

The mold halves 1, 2 have little heat capacity and cool quite rapidly to the ambient temperature. As the mold halves come off the treating core line, they are still relatively warm. The temperatures of the mold halves may be regulated so that there will not be instant fusion at the time the polymeric powder is deposited upon the mold half, and the polymeric thermoplastic resin must be adapted to cool below the fusion point to set when it arrives at the cooling elements 13, 14 so that when the formed articles are ejected from the sintering device, the articles retain their shape. In order to accomplish this result, control of the temperature of the mold halves is essential.

The rate of cooling affects plastic properties, and quick cooling is usually more desirable than slow cooling because quick cooling results in a less crystalline, tougher plastic article than does slow cooling. In any case, the rate of cooling may be controlled by cooling elements 13, 14 to give the properties desired in the plastic or plastics being used. After the mold half has released the plastic article, the mold halves separate, passing to the outside of their conveyor system. As shown in FIG. 1, any number of stations are possible along the inside run or the outside run of the belt, depending upon how many different types of powder one may wish to deposit. Also, if one wishes to manufacture many articles at a rapid rate of speed, the machine has a greater number of stations along the side, i.e., the longer the manufacturing line and the greater number of nozzles found on the line, the faster the articles may be manufactured. That is to say, each nozzle may deposit only a limited amount of powder at each application, but by having a number of nozzles, thicker coats may be built up or the molds may be moved by the nozzles more rapidly.

The outside run of the endless belt may have a preheat station 16 where the mold is heated by bulk energy such as electric coil heat or a gas flame. The next operation may be depositing powder along the inside of the mold half by a nozzle 17. If powder is deposited on the inside of the mold half at this point, then the core nozzle 7 may be used to deposit a thermoplastic resin only along the seams 8, 9 so as to hold together the preformed halves of the final article. In the event that heat has been applied to the mold before the mold half arrives at the core, the core heating step may be induction heat. The article is then cooled and ejected as indicated above.

Figure 2:
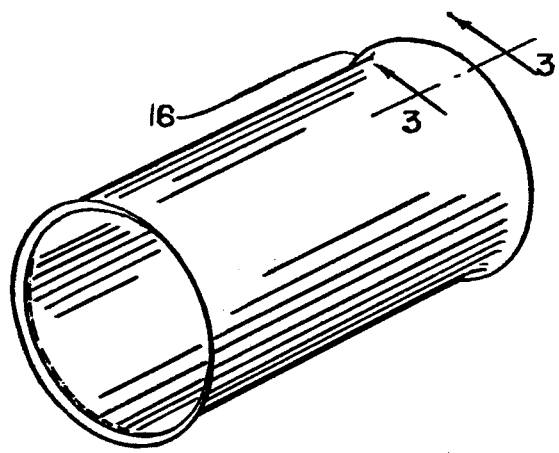
FIG. 2 shows a product of the apparatus having a flanged end.
Figure 3:
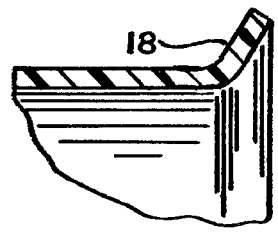
FIG. 3 shows a cross-section view of the flanged end taken along line 3—3.

The shape of the mold is not restricted and this process deposits a fairly even layer of material on any mold, for example, in FIGS. 2 and 3, a flanged end 18 is shown.

Figure 4:
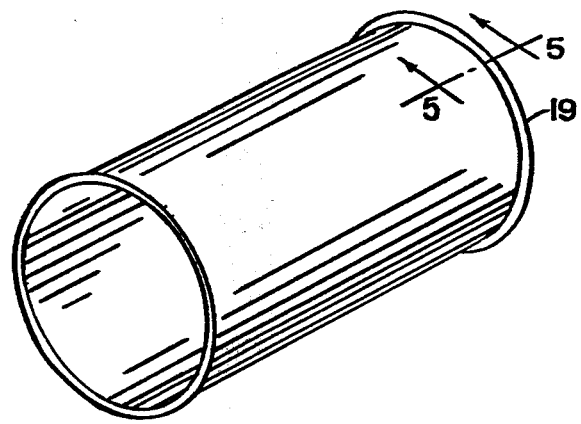
FIG. 4 shows a product of the apparatus having a bead end.
Figure 5:
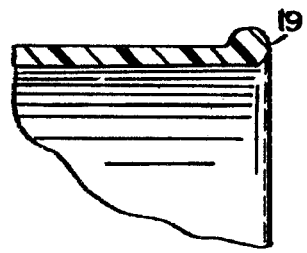
FIG. 5 shows a cross-section view of the bead end taken along line 5—5.

The rate of deposition of this material may be varied by heating selected spots along the mold. Any spot which is heated causes the electrostatic charge of the powder to disperse from the heated spot. Because the electrostatic charge is carried by the powder to the mold, electrostatic charge could build up normally to repel further material from depositing. However, if a spot is heated, the electrostatic charge is dispersed more rapidly and further deposition at the heated spot is possible as shown in FIGS. 4 and 5 to give rise to a thickness 19 two or three times the normal or usual amount of material thickness deposited.

In this way, a variety of thicknesses can be built up at different points depending upon decorative effects or simple strengthening of the article which may be desired.

Figure 6:
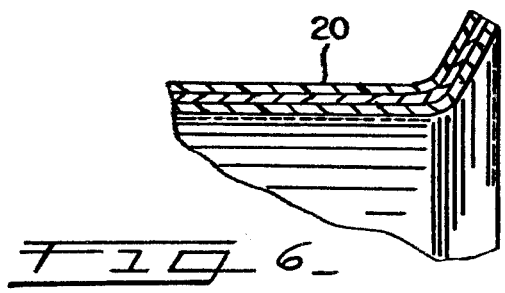
FIG. 6 shows a laminated product of the apparatus.

FIG. 1 shows a single exterior station which has a preheat device 16 and a predeposition of powder station 17. If a composite laminated wall as shown in FIG. 6 is desired, then a series of stations may be mounted on the outer and inner runs of the female mold conveyor. A broken line is shown to indicate that the conveyor may be considerably longer than shown. If one desires to apply a series of powders in layers, by applying a first powder to the mold, allowing it to set, and then applying a series of other powders to the mold, a composite laminate structure may be built up. The various powders used may be selected for a desired characteristic each, such as saran for imperviousness to carbon dioxide, pigmented polyethylene powders for printing or desired color effects, etc.

In the event a multi-layered laminate has been built up in each of the mold parts, the fluidized powder from nozzle 7 is directed along the seam, and this powder must be such as to form a tight bond with the materials used for lamination or at least with the last or inner laminating material.

It is noted that the form of the article may not be cylindrical and may be any other shape, such as in the shape of a cone in which the powder is deposited along the radial surfaces. This cone may be made of laminated composite material or of a single material. In any case, the stacking of such cones is relatively snug and easy.

Similarly, if the cone were shortened to eliminate the mold cooling stage, an article end of any desired sort, such as an easy-open end, can be installed against the rim of the formed polymeric sintered article. Polymeric powder may be deposited at a succeeding heating and cooling stage and the end may be fixed to the rest of the body to form the end of a container.

If it is desired to incorporate the decorative effects of different colors of powder or apply solid inserts, these results may be obtained by using the core nozzles to supply different colors as desired to the areas to be colored. Similarly, powder may be applied to the seamed area between the solid insert and a body. When the powder is sufficiently heated and cooled, a single body is formed. A mask is used for blocking.

It is readily apparent that this apparatus is a high speed, highly controllable process of sintering thermoplastic material into various shapes.

The embodiment shown in FIG. 7 depicts a pipe molding system 50. The powder application techniques used in this system are very similar to those described in connection with FIGS. 1–6. However, as shown in FIG. 7, heaters 51, 52 are used to heat the paired mold halves 53, 54 which are mounted on separate runs 55, 56. After heating of each mold half, powder is deposited in each mold half just prior to the time the mold halves are moved together along the sinter line 57. When mold halves 53, 54 are pressed together, the edges of the fused pulverulent powder are fused one to the other to form a continuous pipe. This fusion takes place end to end and side to side to each section of pipe as it proceeds down the sinter line. In the event that another layer of material is desired to form an interior layer to the pipe, a treating core 58 is located interiorly of the mold sinter line similar to the manner shown in FIG. 1. A different second powder may be used to form an interior surface to the pipe or the same powder may be sprayed onto the fused interior of the pipe. This powder may be sprayed onto the fused interior surface of the pipe 59 and form a strengthening layer to the exterior surface of the pipe. A second powder may be chosen for any property such as tensile strength, lack of permeation to selected substances, etc. Alternatively, a multiplicity of types of powder may be sprayed onto the interior pipe surface to form a plurality of layers of interior coating. If mere strengthening of the pipe is desired, the same powdered material may be sprayed onto the interior of the pipe when the mold halves are lined up side by side to form a continuous tunnel. One feature of this method and apparatus is that the material completely fuses and forms solid pipe 59 having no weakened sections or fusion lines. Still, if desired, another coating may be sprayed onto the interior of the pipe to give the pipe added characteristics such as corrosion resistance or establish a permeability barrier. This material may be the same material as is sprayed out initially into the mold halves or as pointed out above, it may be a variety of nozzles. In all cases, to prevent adherence to the mold after sintering, the mold is coated as needed with a "parting compound", the use of which is typical and well understood in the industry.

The shape of the mold half in this arrangement is shown in FIG. 8. This mold is very similar to the mold half shown in FIG. 1; however, each mold half 53, 54 is placed adjacent to another along the conveyor so that no space exists between mold halves to cause open spaces in the finished pipe 59.

In some instances, it may be desirable to have a flange 60 formed at spaced intervals around the circumference of the pipe 61 at spaced intervals along pipe 61. Flange 60 avoids conduction between the pipe and ground or whatever surface is supporting the pipe. The flange 60 may also be used for hanging the pipe. The pulverulent powder heating and spraying technique in this embodiment is approximately the same as in the preceding embodiments shown in FIGS. 1–7. The flanges are formed of solid material because of the following reasons. (The flange may actually be somewhat longer than shown in the drawing). In actuality, the mold halves 61, 62 pass through the cloud of pulverulent material which is charged electrostatically. The pulverulent material is equally attracted to each interior surface of the mold halves 61, 62. The means that in fact just about as much powder deposits on the interior of the mold half as deposits on the longitudinal sections which form the flanges. Because of this, the powder is deposited in equal thickness on all unshielded parts of each mold half. Each mold half is shielded so that the powder falls only on the areas which later form the pipe 61 and its flanges 60. The contour of mold halves 61, 62 is as shown in cross section of FIG. 10 where the flange section 63 is shown as one half of an annular section. The inside of the mold half and the annular section are left bare so that the charged powder settles onto this surface. The other surfaces are coated with an electrically insulating coating. The end surfaces and the top surfaces are especially coated to avoid possible misalignment and leaking of powdered material.

Similar to the system shown in FIG. 7, the endless conveyor moves continuously around its path and discharges flanged pipe in a continuous manner from the top as shown in FIG. 9.

The molds may be heated prior to depositing powder, and are usually heated thereafter to complete fusion of the applied material. Such heating may be done internally through use of induction (electrical) or radiation apparatus well known in the art or may be externally done by the use of ovens heated by gas, electrical or other energy source.

This electrostatic fluidized powder depositing system may be modified to be used in the manufacture of containers such as; for example, gas tanks. The embodiment in FIG. 11 shows a container 65 that could be a gas tank having opposed flanges 66, 67 for mounting purposes. In this embodiment of our invention, the system shown in FIG. 11 has mounted hollow mold halves similar to those shown in FIG. 12. These hollow mold halves 68, 69 are spaced from each other on a continuous conveyor having two runs 70, 71 and mounted in synchronism so that the mold halves 68, 69 are pressed together as they proceed down the mold sinter line 72 of the system. The mold halves 68, 69 are heated from an exterior source just before they enter the sinter line 72 and are sprayed with powder according to the principles of this invention up to the point where sufficient thickness of powder settles onto each mold half to approximately fill up the ledges 73, 74 (FIG. 12) mounted to each side of the main body area. These ledges 73, 74 define the exterior surface of each flange 66, 67. If the powder is heaped a bit above the top of the ledge then when paired halves 68, 69 are pressed together complete fusion results. As in the preceding embodiment shown in FIG. 9, the flanges 66, 67 may extend somewhat further than shown if desired. In any case, the flanges 66, 67 are totally constructed of fused pulverulent material so as to fill up in a slightly heaping manner so that when the two halves are pressed together, the fused sinter material is thoroughly mixed and the mold line is eliminated. As heretofore, fusing is continued to completion, or completely accomplished if not previously initiated, by passing the molds through one or more heat sources such as electrically inductive apparatus, high temperature radiation sources or by the use of gas or otherwise fired ovens 75. Gas ovens are easily controlled for temperature with controlled atmosphere. Cooling is later accomplished with water or other means at station 76 to complete the finished part and allow it to be removed from the mold.

The insert 77 shown at the upper left in FIG. 11 is adapted to become part of the gas tank 65. This insert 77 is fitted down into a hole 78 in the mold 68. The insert 77 is made of a high melting point material such as metal so that it does not melt or appreciably distort when the mold halves 68, 69 are heated and powder is deposited into them. The insert 77 forms the filling pipe 79 for the gas tank 65. The insert 77 may be coated with a plastic electrical non-conducting material so that a minimum amount of pulverulent material falls onto the insert. Pulverulent material falls to the side of the insert onto the mold (FIG. 15) and since the mold 68 is being preheated, the particles sinter and form together with the insert 77 into cohesive mass so that in this way the insert 77 comes a part of the gas tank 65 itself.

The process of FIGS. 1–12 may be used for the manufacture of corrugated or helical flexible hose 80.

A corrugated hose (flexibility due to corrugation) can be directly molded rather than post formed. The corrugations may be in the shape of pleats to provide flexibility.

The manufacture of this hose may be done with paired molds as shown in FIGS. 7 and 9. The molds 81, 82 down the sinter line 83 are pressed one against the next and the interior of the molds is formed in such a way as to produce a pipe 80 which is either pleated or has an external helix 84 along its length.

FIG. 15 shows a loose mesh 85 or cloth which is shaped and placed into the hollow mold half 86. This loose mesh or cloth has the same general configuration of the mold half 86. In this embodiment, the thickness of the wall of plastic is such as to be sure that the plastic attaches to the mesh along the extent of the mesh so as to utilize the tensile strength of the mesh to avoid blowout of the plastic. The pulverulent material is attracted to the metal mold half and deposits around the mesh and builds up on the mesh to an extent sufficient to be attached along the extent of the mesh.

If it is desired to introduce a gas barrier then metal foil 87 (phantom lines) may be shaped into the mold half before the mesh is placed. The metal foil may be used alone or with the mesh 85. The metal foil may also be placed onto the fused pulverulent material covering the mesh before the mold halves are pressed together along the sinter line 72.

If the mesh 85 is made of metal, the powder will be attracted to the mesh itself and the attachment will be throughout the mesh. If the mesh is metal, electrostatic shielding is accomplished when the mesh is connected to ground by a tab of some sort.

Whether the mesh is made of metal or plastic or other material, the following advantages accrue by use of mesh: rigidity because of differential coefficient of linear expansion with temperature. Tensile strength imparted by the mesh. Steel mesh also has the property of rodent control. This is pertinent in the fabrication of garbage containers where it has been found that rodents will gnaw through plastic containers. A wire mesh placed in the container wall serves as a deterrent to rodents. The final advantage of the use of mesh is from a safety standpoint. That is to say the plastic shatters at low temperature. The plastic itself is not likely to fly but is retained to the mesh.

Powder deposition may also be used in the fabrication of a pipe line 90 of the nature similar to that shown in FIG. 16. FIG. 16 shows the wall 91 of a hose or pipe line. This line is a mesh 92 reinforced plastic conduit having heating elements 93 located near the inner surface 94 of the conduit. The heating elements may be resistance wires 93 and have electricity passed through them when the conduit is in service. In this way, flexibility of the conduit is to some extent assured and both the inner wall 94 of the conduit 90 and the outer layer of the fluid passing through the conduit are heated. Conduits such as this may be used for fire hose in the northern climates especially in the winter, fluid conductors, exposed water pipes, inside a freezer and any other use of this nature. In this construction, a mesh cloth 92 of some sort is near the outer surface 95 of the conduit and the resister type heaters 93 are embedded near the inner surface of the conduit. The conduit 90 itself is constructed largely of a plastic material. This conduit in pipeline form is applicable in the frozen north where oil is to be transported long distances. The conduit interior may be heated so as to decrease the viscosity of the oil which is adjacent the pipe wall. Where fluid viscosity is decreased, flow is enhanced.

The manufacture of a conduit of this sort can be done in the following way. A web 96 of suitable length is unrolled and the top and bottom of the web may be given a coating before the web is folded. FIG. 17 shows a process or machine for folding. The flat reach of web 96 may be coated with a plastic material before it is formed. The coated web passes through spindle shaped rollers 97–99 to be formed into a round shape around the treating core 100. The core 100 shown here has a series of spaced bars 101–106 extending longitudinally along the exterior of the core. The function of these bars is to press the web 96 against the mold halves 107, 108 so that the web forms the outer layer of the conduit 90 which is being sinter molded. Further, the bars serve as guides 101–106 for the metal resistor wires 109–112 which are fed down the core to pass down the core adjacent to the web. Any number of resistor wires may be used. As the web moves forward, plastic is sprayed out from spray stations 112 and 113 to coat the inside of the webbing to the extent shown in the preceding figure. The spray station 113 has ports which are staggered with ports of spray station 112 in order to make sure every part of the web is coated. Otherwise the bars 115 might block the powdered material from reaching the inside of the lapped web 96. The powder is then heated and later cooled to make a perfect fusion. Clearly powdered material may be added before the mold halves close and also more nozzles may be placed down the line on the core depending upon the coatings which one may desire.

Among the advantages inherent in the disclosed basic process is that the product is stress free. That is to say there is less stress in the finished product made by this process than is found in any other technique with the exclusion of rotational molding. A second advantage is that the process is continuous. Thirdly, the two mold halves are placed together and the material which is then pressed into contact between the two mold halves is fused after joining. Fourth, open mold process as compared to rotational molding. This eliminates a seam line of any sort and it makes the material homogeneous and without any weakened parts. Other methods of joining materials leave weakened areas along the seam line.

Advantages of this mode of operation are that there is zero scrap, the method of depositing the material is flexible, the shape of the mold may be varied, i.e., the material may be deposited into a variety of shapes, such as cylindrical, conical etc., decoration may be built into the mold by means of shielding, composite structures are possible, inserts may be applied to an article, there is low pressure on individual molds, and the mold thinness makes for an inexpensive mold easily replacable according to the desired shape of the article.

A final advantage is that the machine can be made of any length to adjust to greater or lesser speed desired.

Further, a variety of powders of exotic nature may be fitted through the polymeric powder nozzles. The only apparent requirement is that the powder will go into an aerosol solution or be amendable to being carried by a gas. For example, any thermoset powder characteristics are lost after heating. Thus, in extrusion molding, all powder not used in the article has its characteristics changed so that it is no longer usable. In our device, only the powder used in the article is heated. The rest of the powder can be collected and reused.

The foregoing is a description of an illustrative embodiment of the invention, and it is applicant's intention in the appended claims to cover all forms which fall within the scope of the invention.

We claim:

1. A method of sinter molding an article, comprising the steps of:

continuously transporting each of a pair of female mold halves open at opposite ends thereof in an endless path in one direction relative to the respective path;

bringing the paths together along a common portion thereof substantially coincident with a stationary elongate treating core;

engaging the mold halves at a first end of the common path portion proximate a first end of the core to provide a female mold open at opposite ends thereof and surrounding the periphery of the core in spaced relation thereto, whereby the mold cavity forms a passage for the core;

maintaining the engagement of the mold halves as they are transported along the common portion of the respective paths to cause the mold to traverse the core from end to end thereof;

electrostatically charging a fusible powder to a different potential from that of the mold;

spraying the charged powder from a nozzle provided on the core onto a surface within the mold as the mold traverses the nozzle, causing the powder to adhere to the surface by electrostatic attraction;

heating the powder until it fuses;

cooling the fused powder to solidification in the mold;

separating the paths at a second end of the common portion thereof beyond a second end of the core opposite the first end thereof;

whereby the mold halves are separated to eject the article from the mold as they are transported past the second end of the common path portion;

and controlling the temperature of each mold half as it is transported along the respective path.

* * * * *